US009140384B2

(12) United States Patent
Hammer et al.

(10) Patent No.: US 9,140,384 B2
(45) Date of Patent: Sep. 22, 2015

(54) SUBSEA CONNECTING APPARATUS AND METHOD

(75) Inventors: Geir Hammer, Cypress, TX (US); Andrew Howard Bohlin, Katy, TX (US)

(73) Assignee: Subsea 7 Limited, Sutton (GB)

(*) Notice: Subject to any disclaimer, the term of this patent is extended or adjusted under 35 U.S.C. 154(b) by 24 days.

(21) Appl. No.: 13/978,706

(22) PCT Filed: Jan. 4, 2012

(86) PCT No.: PCT/GB2012/050005
§ 371 (c)(1),
(2), (4) Date: Nov. 15, 2013

(87) PCT Pub. No.: WO2012/098369
PCT Pub. Date: Jul. 26, 2012

(65) Prior Publication Data
US 2014/0064855 A1   Mar. 6, 2014

(30) Foreign Application Priority Data
Jan. 21, 2011   (GB) .................................. 1101129.3

(51) Int. Cl.
*F16L 1/12*   (2006.01)
*F16L 1/26*   (2006.01)
*E21B 43/013*   (2006.01)

(52) U.S. Cl.
CPC *F16L 1/26* (2013.01); *E21B 43/013* (2013.01)

(58) Field of Classification Search
USPC ............ 405/158, 166, 169, 170, 184.1, 184.4
See application file for complete search history.

(56) References Cited

U.S. PATENT DOCUMENTS

| | | | | |
|---|---|---|---|---|
| 3,922,870 A | * | 12/1975 | Recalde | 405/166 |
| 4,019,334 A | | 4/1977 | Sinclair et al. | |
| 4,230,186 A | | 10/1980 | Lewis, Jr. | |
| 4,611,953 A | * | 9/1986 | Owens | 405/224 |
| 4,717,287 A | * | 1/1988 | Laursen | 405/169 |
| 5,320,175 A | | 6/1994 | Ritter et al. | |
| 5,807,027 A | | 9/1998 | Ostergaard | |
| 6,142,708 A | | 11/2000 | Tarlton et al. | |
| 7,503,727 B2 | | 3/2009 | Ingebretsen et al. | |
| 7,600,569 B2 | | 10/2009 | Routeau et al. | |
| 2009/0297274 A1 | * | 12/2009 | Cafaro et al. | 405/170 |

FOREIGN PATENT DOCUMENTS

| | | |
|---|---|---|
| GB | 2 469 105 | 6/2010 |
| WO | WO 2006/134456 | 12/2006 |
| WO | WO 2008/063080 | 5/2008 |
| WO | WO 2008/155747 | 12/2008 |
| WO | WO 2010/003879 | 1/2010 |

* cited by examiner

*Primary Examiner* — Sean Andrish
(74) *Attorney, Agent, or Firm* — Levy & Grandinetti

(57) ABSTRACT

A method and connecting apparatus for attaching a pipeline termination assembly to a subsea structure. The pipeline termination assembly has a pivot axis member and the subsea structure has one or more capture slots to receive it. The pivot axis member is captured in the capture slot, the slot allowing vertical movement of the pipeline termination assembly. The pipeline termination assembly is rotated about the pivot axis to assume a horizontal position. In the horizontal position, the capture slot permits horizontal movement of the pipeline termination assembly. A capture device mounted on the subsea structure provides the capture slots. At least a part of the capture device is moved with respect to the subsea structure to retain the pivot axis member in the capture slot on rotating the pipeline termination assembly about the pivot axis.

20 Claims, 7 Drawing Sheets

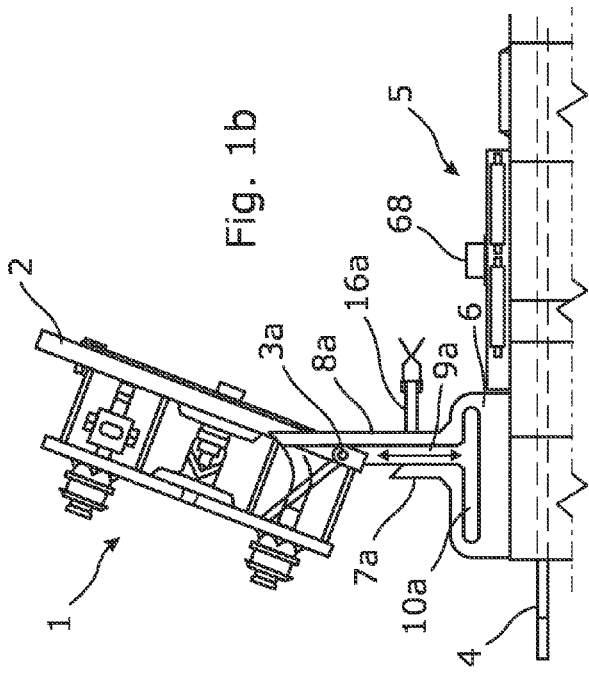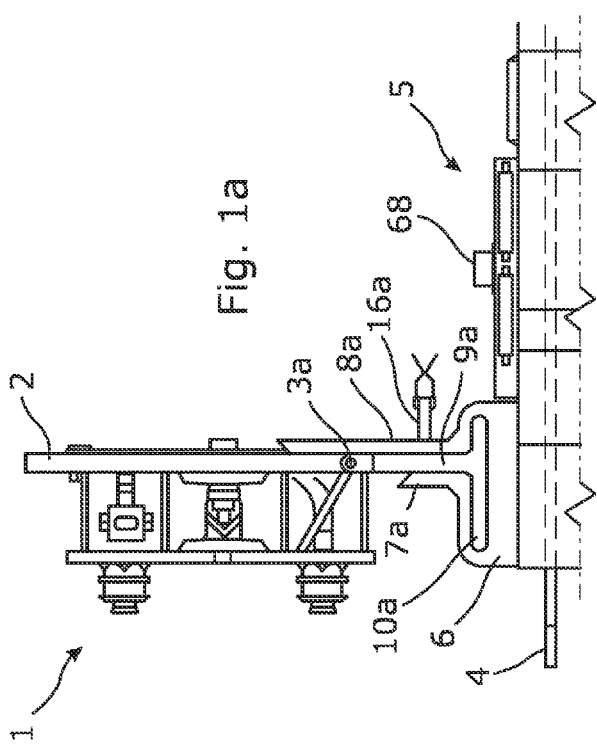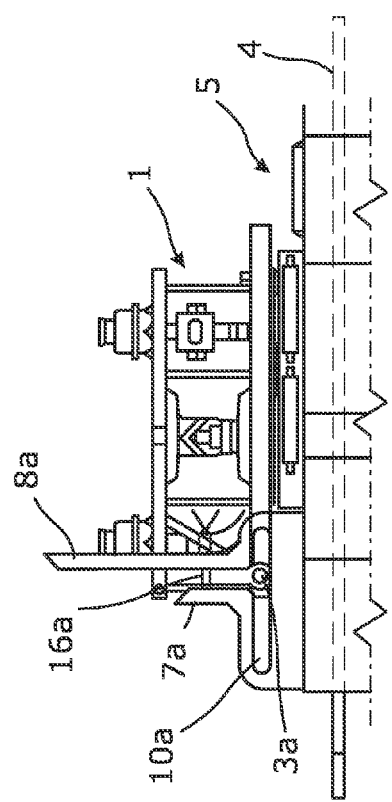

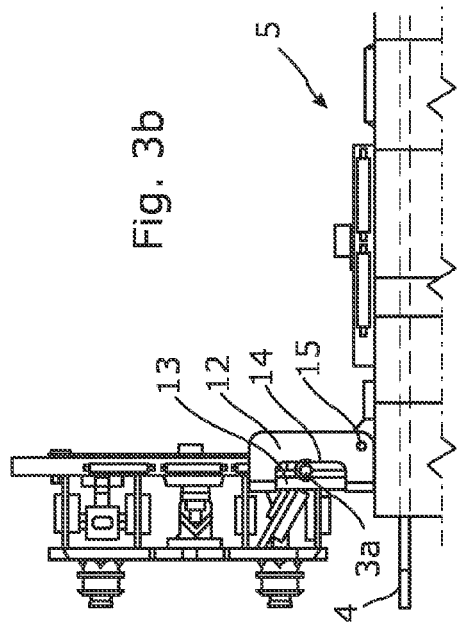
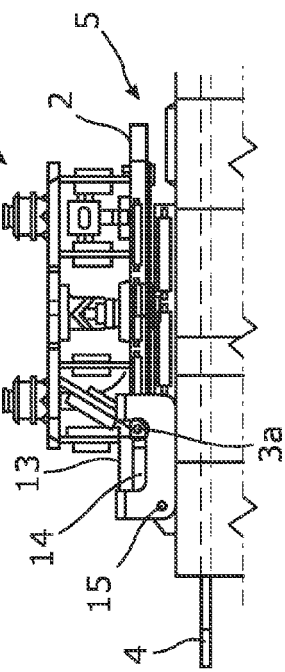
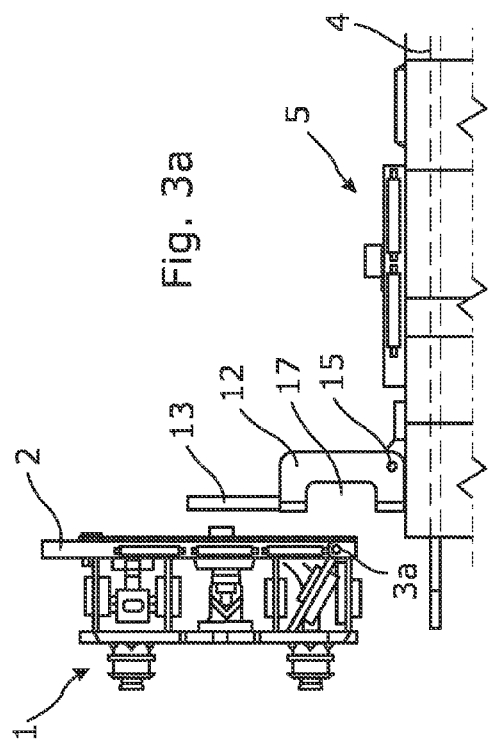
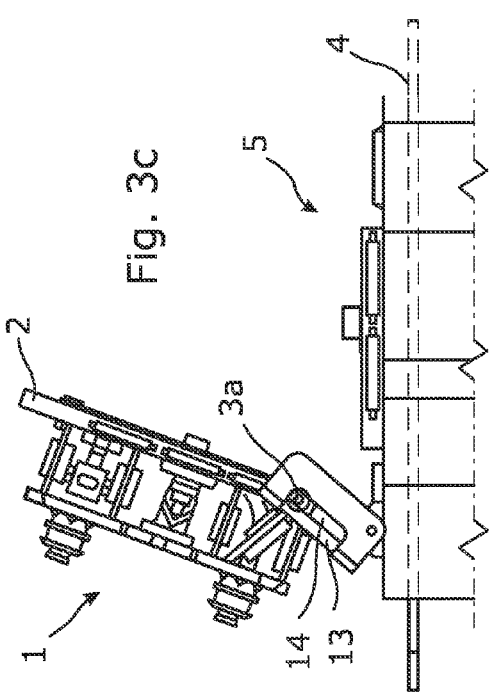

SUBSEA CONNECTING APPARATUS AND METHOD

This Application is the U.S. National Phase of International Application Number PCT/GB2012/050005 filed on Jan. 4, 2012, which claims priority to Great Britain Application Number 1101129.3 filed on Jan. 21, 2011.

FIELD OF INVENTION

The present invention relates in general to equipment and systems for establishing connection between subsea flow lines and seabed structures. The invention also relates to pipeline terminations and methods of establishing connections between pipelines, as well as to methods for initiation of a pipeline.

BACKGROUND OF INVENTION

In recent years, development within offshore oil and gas exploration has been directed to subsea installations for processing and transport of oil and gas. Such subsea installations replace the traditional platforms, where oil and gas was transported up to the platform for further processing and transport. This development of subsea production, processing and transport systems has resulted in an increasing need for subsea connection arrangements for coupling together a pipeline being laid from a surface vessel with a static structure installed on the seabed. The pipeline may subsequently be connected to another pipe termination, such as for example a subsea production or injection well, possibly using a so-called spool piece without in most cases requiring any assistance of divers. The spool piece is designed to establish a flow connection between the pipeline end structure and the pipe termination. The spool piece is provided with a spool piece hub which is to mate with a corresponding pipeline hub arranged at the pipeline end structure.

The process of connecting the pipeline to the static subsea structure is not straightforward. Moreover, the process may differ depending on the water depth. The end of the pipeline is provided with an end structure, which will typically be a pipeline end termination (PLET), pipeline end module (PLEM), flexible line or flowline end termination (FLET) or skid.

In shallow water, the process typically comprises the following steps:
 (i) An anchor, generally a drag-type anchor, is first installed on the seabed close to the desired target area.
 (ii) An initiation cable, usually wire rope, is then selected to suit the anticipated initiation loading, taking account of a suitable safety factor. The initiation cable is made of length such that the end structure can reach its target area.
 (iii) The initiation cable is then recovered from the sealed/anchor or deployed from a winch on the surface vessel and is connected to the anchor and to the end structure while it is still on the surface vessel.
 (iv) The surface vessel is then moved to a predetermined distance from the seabed anchor until the initiation cable is held at a tension determined by the specific installation parameters.
 (v) The pipeline is then deployed from the surface vessel in accordance with job-specific installation parameters. As the pipeline is deployed, the lay equipment angle is adjusted to adjust the pipe departure angle, and the vessel is moved in the direction of pipe-lay, whilst maintaining suitable tension in the initiation cable and the pipeline. This process is continued until the end structure lands on the seabed, after which normal pipe-lay can commence.

In deep water, the process is typically as follows:
 (i) An anchoring device, which may be a drag anchor, a suction pile or a suction can, is installed at a predetermined distance from the target area for the end structure. In most cases, this distance will be in excess of 15 to 25 meters, and is determined by the dynamic loads and stresses expected to be imposed on the pipeline during the installation process.
 (ii) An initiation cable, typically a wire rope, is sized to suit the expected initiation loading, taking account of a safety factor. The initiation cable may consist of two parts: one part pre-connected to the anchoring device and another part connected to the end structure. The length of the cable is selected such that, once the anchoring device is connected to the end structure, the end structure can be landed on the predetermined target area. The target area is sized to accommodate design tolerances for the subsequent tie-in of the end structure to another structure or well head, using a rigid pipe spool, rigid jumper or flexible jumper. It will be understood that as the distance between the anchoring device and the target area becomes shorter, the dynamic loads and stresses in the pipeline become higher as a result of the environmental conditions, determined by a combination of vessel characteristics, wave height, wave period, wave direction, current profile and current direction. If a relatively short initiation cable is used, stricter weather criteria may need to be set to allow installation to take place without over-stressing the pipeline.
 (iii) The pipeline with its end structure is deployed vertically from the surface installation vessel until the initiation cable reaches a position at which it can be connected to the anchoring device or anchor cable by means of an ROV (remotely operated vehicle).
 (iv) The surface vessel is then moved to a predetermined distance from the seabed anchoring device such that the initiation cable is held in tension, according to job-specific installation parameters.
 (v) Laying of the pipeline is then initiated step-by-step in accordance with job-specific installation parameters. As pipe is deployed from the vessel, the lay equipment angle is modified to adjust the pipe departure angle, and the vessel is moved in the direction of pipe laying, whilst maintaining tension in the initiation cable. These steps are continued until the end structure lands on the seabed and normal pipe-lay can commence.

One pipeline connection arrangement and method for subsea connection of a pipeline to a spool piece hub is described in U.S. Pat. No. 4,019,334 A. The spool piece hub is here attached to a foundation arranged on the seabed. The pipeline end structure, including a pipeline hub, is secured to a trunnion assembly and is installed on the subsea foundation by being lowered together with a trunnion assembly downwards from a surface vessel guided by a guide cable. After the pipeline hub and the trunnion assembly have been landed on the subsea foundation and secured thereto, a remotely operated connecting tool is lowered downwards from the surface vessel and is operated to displace the spool piece hub into engagement with the pipeline hub, whereupon the connecting tool is operated to actuate a clamping device so as to clamp together the spool piece hub and the pipeline hub. The connecting tool is then retrieved to the surface vessel. This known connection arrangement and method require that the spool piece and the subsea foundation are installed on the seabed before the pipeline is laid out on the seabed and the pipeline end structure has to be secured to the subsea foundation before the remaining part of the pipeline is laid out on the seabed.

Another pipeline connection arrangement for subsea connection of a pipeline to a spool piece is known from U.S. Pat. No. 6,142,708 A. The pipeline hub is here secured to a landing platform which is to be lowered onto the seabed from a surface vessel. The spool piece hub is secured to a connecting tool which is lowered downwards onto the landing platform so as to come to rest thereon, whereupon the connecting tool is operated to displace the spool piece hub into engagement with the pipeline hub. The pipeline hub is secured to the rather complex and bulky landing platform before being lowered into the sea from a surface vessel. The lay ramp and other equipment of the pipe laying vessel have to be adapted and dimensioned for enabling manipulation and lay-out of the landing platform. This raises the cost for the pipe laying vessel and reduces the number of vessels available for the pipe laying operation which could cause high costs for performing the pipe laying operation.

US Patent Application No. 2007/0269270 A1 describes a method of enabling subsea connection of a pipeline to a spool piece without requiring any complex and/or bulky equipment to be attached to the pipeline end structure before it is lowered into the sea from a surface vessel. In this method, a pipeline termination skid is so designed that a pipeline end structure may be mounted thereto subsea by lowering the pipeline end structure into a seat at one or several holding devices of the pipeline termination skid and thereafter displacing the pipeline termination skid along the pipeline end structure so that the respective seat is brought into engagement with an alignment element secured about the pipeline end structure so as to thereby fix the pipeline end structure axially and radially in relation to the pipeline termination skid.

Another system for interconnecting two pipelines at a subsea position is described in U.S. Pat. No. 5,807,027 A. A first pipeline is initially freely suspended whilst a second pipeline is mounted on a bottom base to a manifold frame. The end section of the first pipeline is provided with a socket type termination with a front end which is provided with means for coupling of the terminator to complementary pipe coupling means on the second pipeline. The terminator is provided with a laterally directed longitudinally shaped anchor element and the manifold frame is provided with receiving means for receipt and fixation of the anchor element. The anchor element and the receiving means are dimensioned and positioned such that when the anchor element is placed in position in the receiving means, the coupling means of the terminator will be positioned directly in front of the complementary coupling means on the second pipeline.

WO 2008/063080 teaches various approaches for achieving a guide and hinge-over connection between the end of a first pipeline being laid and the end of a second pipeline already installed on the sea floor. In one of these embodiments, a connector at the end of the first pipeline is provided with a bail structure consisting of two arms linked by a bar. The bar is received in a frame on a connector of the second pipeline. When the bar is located in the slot, the connector on the first pipe pivots round until the pipe ends are in position for engagement with each other.

It is also possible to lay pipeline with a pipeline end termination (PLET) or manifold (PLEM) attached to the leading end. However, these are large devices typically weighing between ten and fifty metric tonnes. When such a large and heavy device is lowered on the end of the pipe from a surface pipe lay vessel, difficulties may arise where the surface vessel is subject to heave which may be plus or minus one meter or more. It is difficult to land the PLET or PLEM safely without damage at a known location and orientation under conditions of vessel heave which may be transmitted to it down the pipeline.

An object of the invention is to enable capture of a PLET/PLEM in a device on the seabed without causing damage to the subsea structure or overstressing the pipeline as a result of the effect of vessel heave.

Another object of the invention is to enable initiation of a pipeline in a congested seabed area where conventional techniques using anchors and winch cables may not be feasible.

SUMMARY OF INVENTION

In a first aspect, the invention provides a method for attaching a pipeline termination assembly having a pivot axis member defining a pivot axis for the pipeline termination assembly to a subsea structure having one or more capture slots to receive the pivot axis member, comprising: capturing the pivot axis member in the one or more capture slots, the one or more slots allowing vertical movement of the pipeline termination assembly; and rotating the pipeline termination assembly about the pivot axis defined by the captured pivot axis member to assume a horizontal position, the one or more capture slots then permitting horizontal movement of the pipeline termination assembly, wherein a capture device mounted on the subsea structure provides said one or more capture slots, the method further comprising moving at least a part of the capture device with respect to the subsea structure for retaining the pivot axis member in the one or more capture slots on rotating the pipeline termination assembly about the pivot axis.

This approach provides effective capture of the pipeline termination in a known location while allowing for vertical movement to compensate for vessel heave.

Preferably, moving at least a part of the capture device comprises pivoting at least a part of the capture device.

In one arrangement, the capture device is fixedly mounted on the subsea structure. In such a case, the said capture device may provide a first vertically extending arm and a second vertically extending arm, said one or more capture slots comprising a first slot having a vertical portion defined between said arms and a further horizontal portion at the lower end of the vertical portion. Preferably, said second arm is longer than said first arm.

The lower end of the second arm may then pivot from a vertical position to a horizontal position to capture the pivot axis member in the horizontal portion of the first slot.

In another arrangement, said capture device is pivotably mounted on the subsea structure. In such a case, the capture device may receive said pivot axis member in a recess on one side and a movable locking bar traps the pivot axis member in said recess, whilst permitting vertical movement thereof.

If this is done, said capture device may pivot between a vertical position where it receives the pivot axis member and a horizontal position in which said recess provides a horizontal slot for accommodating expansion or contraction of the pipeline.

In a second aspect, the invention provides connecting apparatus for attaching a pipeline termination assembly to a seabed structure, comprising: one or more capture slots on the seabed structure for receiving a pivot axis member on a pipeline termination assembly; said one or more capture slots permitting vertical movement of the pipeline termination assembly when the pipeline extends vertically and horizontal movement of the pipeline termination assembly when the pipeline extends horizontally, wherein said one or more capture slots are provided in a capture device mounted on the subsea structure; and wherein at least a part of the capture device is movable with respect to the subsea structure for retaining the pivot axis member in said one or more capture slots.

In one such arrangement, the pivot axis member comprises a pair of trunnions on the pipeline termination assembly.

SPECIFIC EMBODIMENTS OF INVENTION

For a better understanding of the invention, and to show how the same may be carried into effect, the invention will now be described by way of example, with reference to the accompanying drawings in which:

FIG. 1a shows a first stage of connection between a pipeline termination assembly and a subsea structure according to a first embodiment of the invention;

FIG. 1b shows a second stage of the connection between the pipeline termination assembly and the subsea structure according to the first embodiment of the invention;

FIG. 1c shows a third stage of a connection process between a pipeline termination assembly and a subsea structure according to the first embodiment of the invention;

FIG. 3a shows a first stage of a connection process between a pipeline termination assembly and a subsea structure according to a third embodiment of the invention;

FIG. 3b shows a second stage of a connecting process between a pipeline termination assembly and a subsea structure according to the third embodiment of the invention;

FIG. 3c shows a third stage of a connecting process between a pipeline termination assembly and a subsea structure according to the third embodiment of the invention;

FIG. 3d shows a fourth stage of a connecting process between a pipeline termination assembly and a subsea structure according to the third embodiment of the invention;

In order to allow a pipeline end termination assembly such as a pipeline end termination (PLET) or a pipeline end manifold (PLEM) to be landed without damage at a known location and orientation on a subsea structure, independent of any vessel heave that may be transmitted to it down the pipeline, it is advantageous to capture the PLET/PLEM in a suitable capture device on the subsea structure. The retention of the PLET/PLEM in the subsea structure has to be arranged in such manner that the vessel mounted pipe lay system and/or the pipe between it and the PLET/PLEM is not overstressed by the effect of vessel heave.

In outline, the proposed solution is to provide the pipeline termination assembly with a pivot axis member—in the embodiments shown, this is provided by trunnions—which can be captured in a slot arrangement at a fixed and predetermined location on the subsea structure on the seabed. The pipeline and termination assembly are lowered substantially vertically below the pipe lay vessel. The trunnions eventually bear against a set of arms, occasionally referred to in the following as bump posts, which extend above the structure on the seabed. The trunnions are constrained to move along these arms in a substantially vertical direction. It is this possibility of vertical movement which accommodates the vessel heave whilst at the same time maintaining the termination assembly in a known location.

Once the termination assembly has been captured in this way, the pipe lay vessel can move away from its initial location whilst simultaneously deploying more pipeline. This manoeuvre causes the termination assembly gradually to rotate about its trunnions from a vertical position to a horizontal position. As it does so, the effect of vessel heave on the termination assembly diminishes because the pipeline loading gradually changes from mostly tensile force, when the pipe is vertical and moving the termination assembly up and down along the arms, to a situation where the loading is mostly in bending, with the pipe being horizontal and flexing between the vessel and the largely stationary termination assembly.

This operation continues until the pipeline termination assembly eventually reaches a horizontal position at a known location and orientation. In one embodiment, the arms are configured to provide a pair of inverted T-shaped slots for capturing the trunnions. Once the pipeline is laid down, the trunnions engage with the horizontal bars of the T-shaped slots, thus allowing the termination assembly to move backwards and forwards as the pipeline expands or contracts with changes in temperature during the lifetime and operation of the pipeline.

Figure 6:
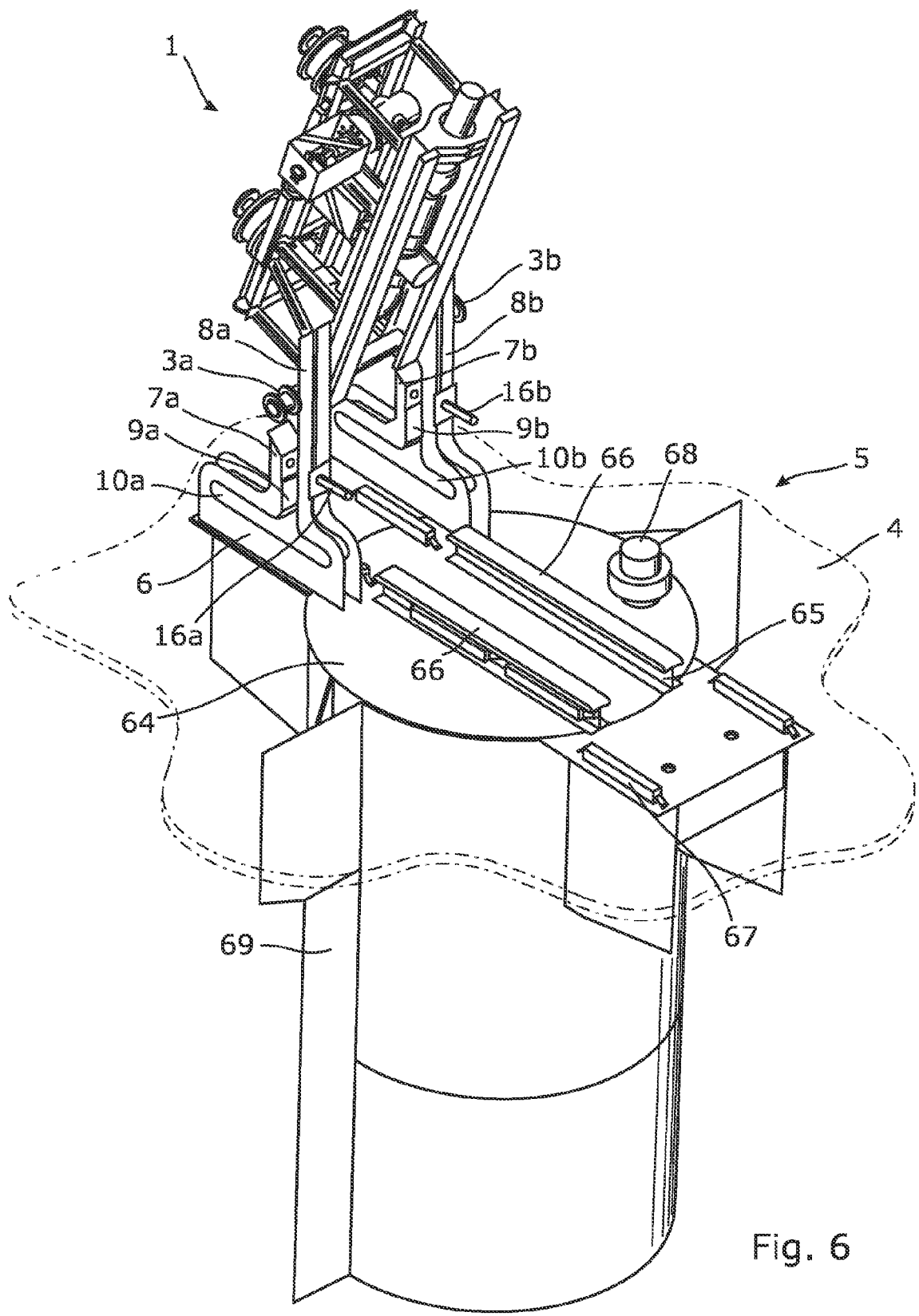
FIG. 6 shows a perspective view of the PLET of FIG. 4 during its engagement with a subsea structure according to the first embodiment of the invention.

A first embodiment of the invention will be described with reference to FIGS. 1a to 1c (certain features of this embodiment are also shown in more detail in FIGS. 6 and 7). In this embodiment, the capture device is substantially stationary. FIG. 1a shows a pipeline termination assembly 1 at the lower end of a pipeline 2, which is suspended from a surface pipe laying vessel, not shown in the figures. At the lower end of the termination assembly 1, two trunnions extend laterally from respective sides of the assembly 1. One trunnion 3a is visible in FIGS. 1a to 1c (FIG. 6 illustrates both trunnions 3a and 3b). On the seabed surface 4 is provided a subsea foundation structure 5, which could be suction piles, a mud mat or other suitable foundation. Secured to the subsea foundation structure 5 is a capture structure 6 which provides two pairs of vertically emending arms. One pair 7a and 8a is shown in FIGS. 1a to 1c. A vertically extending slot 9a is defined between the arms 7a and 8a. The vertical slot 9a merges with a horizontal slot 10a in the base part of the capture structure 6. As shown in FIG. 6, a vertical slot 9b is defined in a similar way between the second pair of arms 7b and 8b, and merges with a horizontal slot 10b. As will be apparent, arm 8a extends upwardly for a greater distance than arm 7a and provides a bump post for engagement with trunnion 3a of the assembly 1. Latching pin 16a is provided on a respective arm 8a for sliding engagement through the arm 8a and into a receiving aperture on arm 7a—this is more clearly shown, along with a corresponding latching pin 16b on the other arms 8b and 7b, in FIGS. 6 and 7. Trunnion 3a is then lowered downwardly into the slot 9a and captured in position by means of latching pin 16a. Trunnion 3b (as shown in FIG. 6) is similarly lowered into a further slot defined between the second pair of arms 7b and 8b and latched into position with its further latching pin 16b. Lowering of the termination assembly 1 coupled with movement of the surface Bessel causes the termination assembly 1 to begin to rotate in a clockwise direction, as shown in FIG. 1b. This rotation continues until the termination assembly comes to rest on the subsea structure in the final position shown in FIG. 1c, which also shows the latch pin 16a in a closed position. In this position, the trunnions 3a, 3b are located in the horizontal slots 10a, 10b, thus providing freedom of movement in the horizontal direction to accommodate expansion or contraction of the pipeline.

FIGS. 2a to 2d show a second variant of the connection system in which the front vertical arms 8a of the trunnion capture arrangement are hinged at respective pivotable joints (only one joint 11 being visible in the Figure) to the remainder of the capture device 6.

Figure 2A:
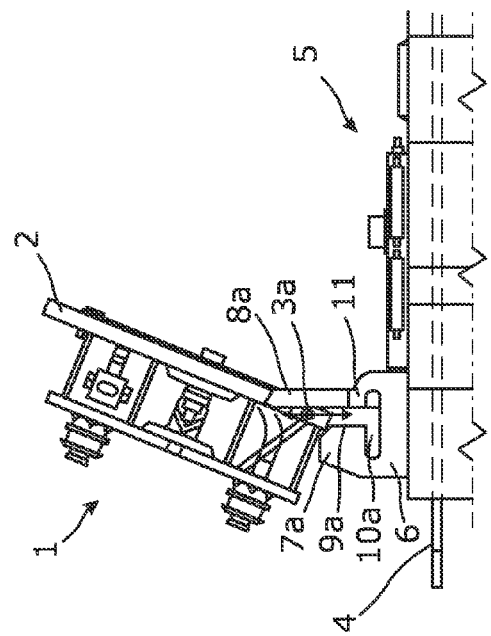
FIG. 2a shows a first stage of a connecting process between a pipeline termination assembly and a subsea structure according to a second embodiment of the invention.
Figure 2B:
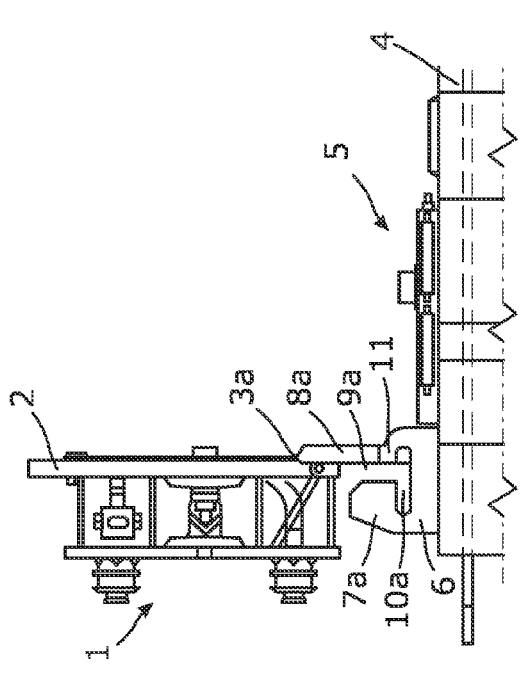
FIG. 2b shows a second stage of a connection process between a pipeline termination assembly and a subsea structure according to the second embodiment of the invention.
Figure 2C:
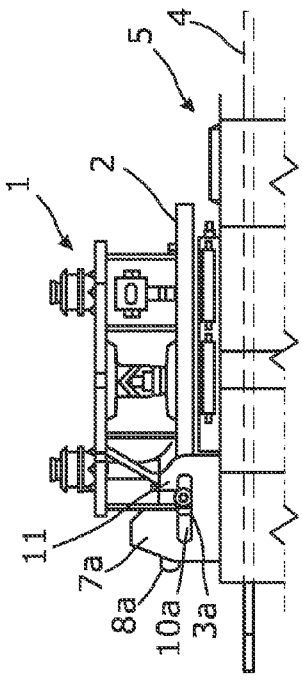
FIG. 2c shows a third stage of connection between a pipeline termination assembly and a subsea structure according to the second embodiment of the invention.
Figure 2D:
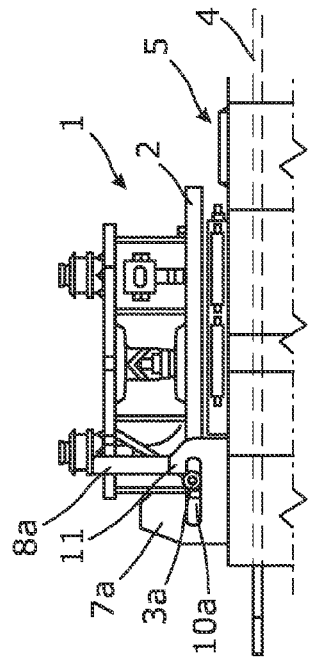
FIG. 2d shows a fourth stage of a connecting process between a pipeline termination assembly and a subsea structure according to the second embodiment of the invention.
Figure 4:
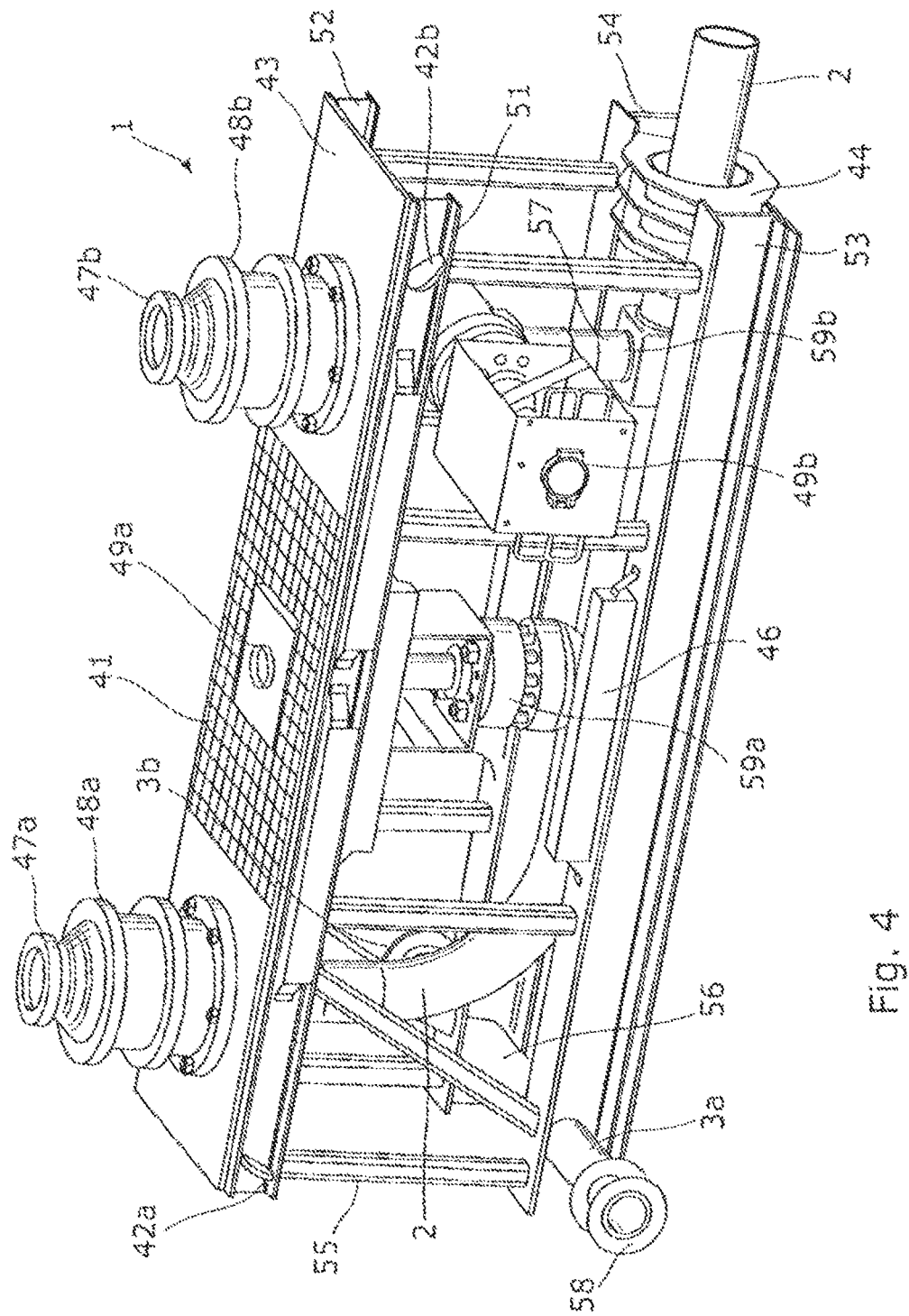
FIG. 4 shows a perspective view of an example of a pipeline end termination (PLET) having a pair of laterally extending trunnions.
Figure 5A:
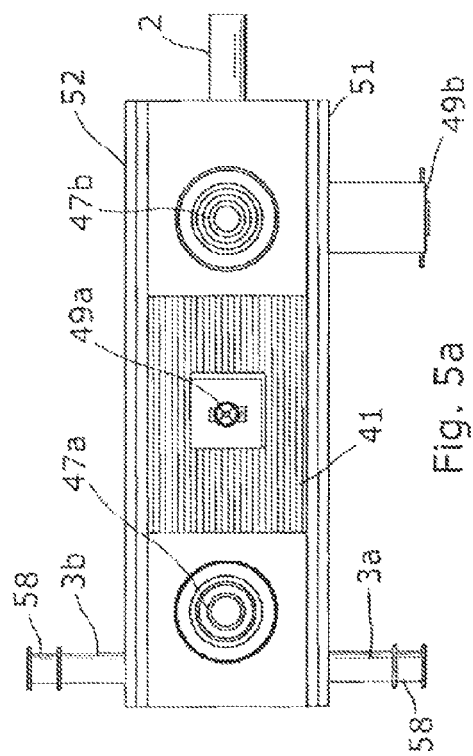
FIG. 5a shows a plan view of the PLET of FIG. 4.
Figure 5B:
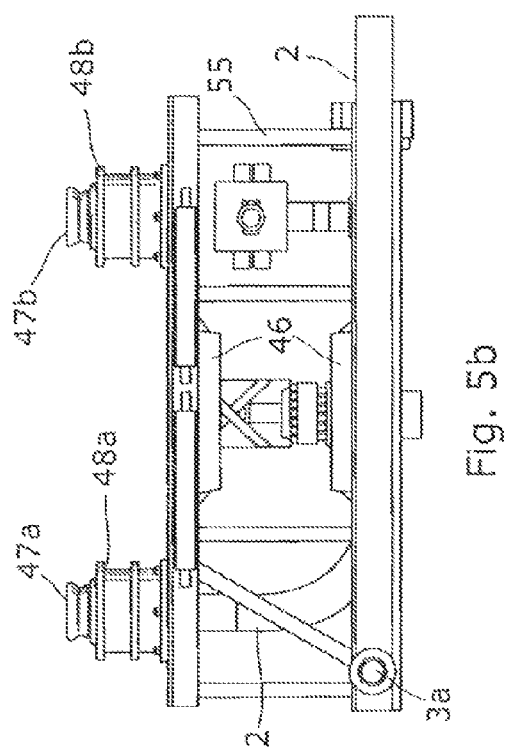
FIG. 5b shows a side view of the PLET of FIG. 4.
Figure 5C:
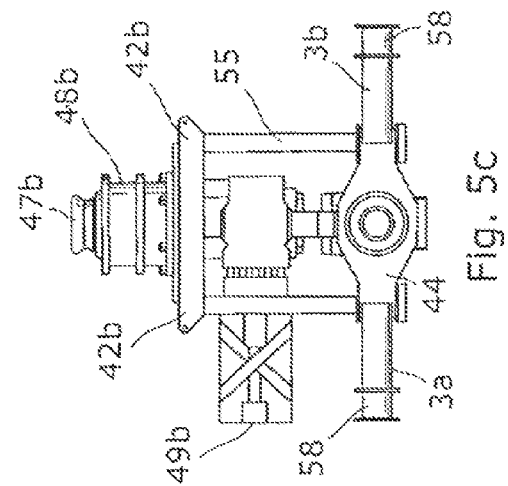
FIG. 5c shows an end view of the PLET of FIG. 4.

As shown in FIG. 2a, the connection procedure begins with the end termination assembly 1 being brought into position so that the trunnions 3a rest against the vertical arms 8a as illustrated (only one trunnion and set of arms are shown, but the arrangement is symmetrical and is configured in the same way for the other trunnion). Since the arms are unable to rotate in a clockwise direction, the horizontal pull of the pipeline from the surface vessel is resisted. As in the first variant shown in FIGS. 1a to 1c, the pipeline termination assembly 1 is lowered so that the trunnions 3a slide down the vertical arms 8a into the slots 9a until they reach the base of the slot as shown in FIG. 2c. At this point, the pipeline termination assembly has reached a horizontal position resting on the subsea structure 5. The vertical arms 8a can then be rotated in an anti-clockwise direction until they reach the position shown in FIG. 2d in order to capture the trunnions 3a in the horizontally extending expansion/contraction slots 10a. Arms 8a are then locked in position using suitable latches or locking mechanisms.

The third variant of the connection method is shown in FIGS. 3a to 3d. In this variant, the capture device 6 is itself hinged to the subsea structure 5 at a pivot point 15. As shown in FIGS. 3a and 3b, the pipeline termination assembly 1 is advanced horizontally until the trunnions 3a (again, only one trunnion is shown, but the arrangement is symmetrical) enter respective cut-outs 17 on the back face of the capture device 12. Respective vertical locking bars 13 are then lowered behind the trunnions 3a thus trapping them within the cut-outs 17 as shown in FIG. 3b. The trunnions 3a are then free to move in a vertical direction within slots 14 formed between the rear face of the capture device 12 and the locking bars 13. With the capture device in the vertical direction shown in FIG. 3b, the trunnions 3a, can move in a vertical direction to accommodate heave of the vessel. Having reached the position shown in FIG. 3b, the capture device 12 is then released from its vertical position and allowed to rotate in a clockwise direction as the pipeline is laid away from it as shown in FIG. 3c. Eventually the capture device and the pipeline termination assembly 1 reach the horizontal position shown in FIG. 3d and are locked in this position. The slots 14 are now horizontal and accommodate horizontal movement of the trunnions 3a in response to expansion or contraction of the pipeline 2.

In all variants, the fixed subsea structure 5 may be a suction pile on which is mounted a chassis carrying the capture device 6 or 12 together with its bump posts. Alternatively, the subsea structure 5 may be a mud mat or other suitable foundation assembly.

Although FIGS. 1 to 3 described above show only a single trunnion 3a, it will be understood that in the preferred embodiments there is provided a pair of trunnions, extending laterally from respective sides of the pipeline termination assembly 1. This will be better apparent from FIGS. 4, 5a-5c, 6 and 7 described below.

Various locking pins and release mechanisms are provided to capture the trunnions 3a, 3b in the slots, to allow rotation and locking of the locking arms 8a in the second variant, and of the capture device 12 in the third variant. Such locking pins may be operated automatically, e.g. by spring-loading or gravity, operated by a remotely operated vehicle (ROV) or automated with ROV back-up.

In a practical embodiment, an ROV may be employed in an observational role to monitor the landing of the pipeline termination assembly against the bump post and the subsequent lowering or rotating operations.

The same ROV or a further ROV may be provided for operations requiring intervention, such as operation of the latches or releases.

Reference is now made to FIGS. 4 and 5a to 5c, which show various views of a pipeline end termination (PLET) as one commonly used form of pipeline termination assembly.

The PLET 1 comprises a substantially parallelepipedal frame structure formed of four steel girders 51, 52, 53 and 54 of I section linked together by struts 55. At one side of the frame structure, and supported by girders 51 and 52, is mounted a piping support structure 43. Girders 53 and 54 and connected together by an anchor bulkhead 44 and by a trunnion support 56.

The end of the pipeline 2 is secured through the anchor bulkhead 44 and terminates at a pipeline hub 47a, which is supported by hub support structure 48a mounted on piping support structure 43. A branch pipe 57 is coupled to a second pipeline hub 47b, which is supported by a second hub support structure 48b on the piping support structure 43.

The two trunnions 3a and 3b extend laterally from the termination structure, supported by respective girders 53 and 54 and by the trunnion support 56. Each trunnion is provided with a respective end stop 58 to help prevent the trunnions from slipping off the capture device during the capture procedure described above.

A valve operating member 49a is provided to operate a flow control valve 59a for controlling flow through the hub 47a. Similarly, a second valve control member 49b is provided for valve 59b for controlling flow through the second hub 47b. A protection grating 41 is provided to cover an access aperture in the plate 43.

Anodes 46 are provided on respective girders 53, 54 and padeyes 42a, 42b are provided on girders 51 and 52 for lifting or handling of the structure.

FIG. 6 shows, in perspective view, a subsea foundation structure 5 according to the first embodiment as described above, provided with the capture device 6. The figure illustrates clearly bow the capture device consists of two pairs of arms. A first pair of arms 7a, 8a defines a capture slot 9a therebetween for capturing the first trunnion 3a, using latching pin 16a. The second pair of arms 7b, 8b defines a second capture slot 9b therebetween for capturing the second trunnion 3b using latching pin 16b. The capture slot 9a merges into a horizontal slot portion 10a serving as a first thermal expansion channel. Similarly, slot 9b merges into a corresponding horizontal slot portion 10b, serving as a second thermal expansion channel.

The foundation structure 5 also provides a pair of landing beams 65, having respective sliding pads 66, and anodes 67. The structure 5 further includes a suction pile 64 having a suction valve 68 and a stabilization strake 69. As will be understood, the suction pile 64, with its strake 69, is embedded into the seabed, and extends down below the seabed surface 4.

FIG. 6 shows the pipeline end termination 1 in the process of engaging, by means of its trunnions 3a, 3b, with the bump beams 8a, 8b and beginning its rotation into its final horizontal position supported by the landing pads 66.

Figure 7:
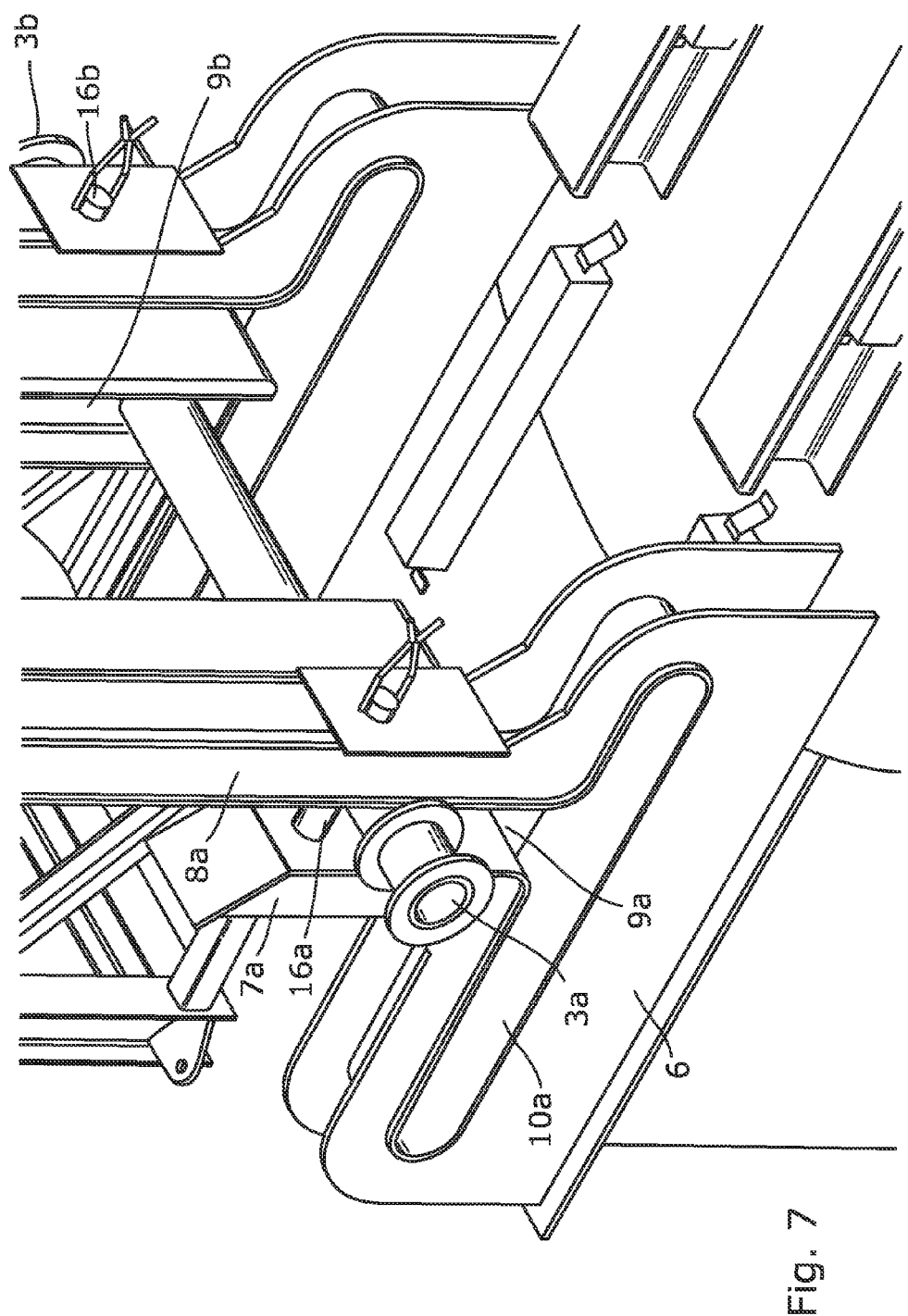
FIG. 7 shows an enlarged view of a portion of the PLET of FIG. 6 illustrating latching pins.

FIG. 7 shows an enlarged view of the latching mechanism including latching pins 16a and 16b for capturing the trunnions 3a, 3b in the slots 9a, 9b.

The invention claimed is:

1. A method for attaching a pipeline termination assembly having a pivot axis member defining a pivot axis for the pipeline termination assembly to a subsea structure having one or more capture slots to receive the pivot axis member, comprising:

capturing the pivot axis member in the one or more capture slots, the one or more capture slots allowing vertical movement of the pivot axis member of the pipeline termination assembly; and rotating the pipeline termination assembly about the pivot axis defined by the captured pivot axis member engaged in the one or more capture slots to assume a horizontal position, the one or more capture slots then permitting horizontal movement of the pivot axis member of the pipeline termination assembly back and forth along the capture slot as the pipeline expands or contracts;

wherein a capture device mounted on the subsea structure provides said one or more capture slots, the method further comprising moving at least a first part of the capture device with respect to the subsea structure to retain the pivot axis member in the one or more capture slots on rotating the pipeline termination assembly about the pivot axis.

2. The method according to claim 1, wherein moving at least the first part of the capture device comprises pivoting at least the first part of the capture device.

3. The method according to claim 1, wherein said capture device is fixedly mounted on the subsea structure.

4. The method according to claim 3, wherein said capture device provides a first vertically extending arm, and a second vertically extending arm, said one or more capture slots comprising a first slot having a vertical portion defined between said arms and a further horizontal portion at the lower end of the vertical portion.

5. The method according to claim 4, wherein said second arm is longer than said first arm.

6. The method according to claim 4, wherein the lower end of the second arm pivots from a vertical position to a horizontal position to capture the pivot axis member in the horizontal portion of the first slot.

7. The method according to claim 1, wherein said capture device is pivotally mounted on the subsea structure.

8. The method according to claim 7, wherein said capture device receives said pivot axis member in said one or more capture slots and a movable locking bar traps the pivot axis member in said one or more capture slots, while permitting vertical movement thereof.

9. The method according to claim 7, wherein said capture device pivots between a vertical position where the said capture device receives the pivot axis member and a horizontal position in which said one or more capture slots provide one or more horizontal slots for accommodating expansion or contraction of a pipeline.

10. A connecting apparatus for attaching a pipeline termination assembly to a subsea structure on a seabed, comprising:

a pivot axis member on a pipeline termination assembly;

one or more capture slots on the subsea structure for receiving said pivot axis member; said one or more capture slots permitting vertical movement of the pivot axis member when the pipeline extends vertically and horizontal movement of the pivot axis member when the pipeline extends horizontally, wherein said one or more capture slots are provided in a capture device mounted on the subsea structure; and wherein at least a first part of the capture device is movable with respect to the subsea structure for retaining the pivot axis member in said one or more capture slots.

11. The connecting apparatus as claimed in claim 10, wherein at least the first part of the capture device is pivotable with respect to the subsea structure for retaining the pivot axis member in said one or more capture slots.

12. The connecting apparatus according to claim 10, wherein said capture device is fixedly mounted on the subsea structure.

13. The connecting apparatus according to claim 12, wherein said capture device includes a first vertically extending arm and a second vertically extending arm, said one or more capture slots comprising a first slot having a vertical portion defined between said arms and a further horizontal portion at the lower end of the vertical portion.

14. The connecting apparatus according to claim 13, wherein said second arm is longer than said first arm.

15. The connecting apparatus according to claim 13, wherein the lower end of the second arm is pivotally mounted on the capture device; and is pivotable to a horizontal position to capture the pivot axis member in the horizontal portion of the first slot.

16. The connecting apparatus according to claim 10, wherein said capture device is pivotally mounted on the subsea structure.

17. The connecting apparatus according to claim 16, wherein said capture device comprises one or more horizontal slots for receiving said pivot axis member and a movable locking bar for trapping the pivot axis member in said one or more capture slots, while permitting vertical movement thereof.

18. The connecting apparatus according to claim 16, wherein said capture device is pivotable between a vertical position for receiving the pivot axis member and a horizontal position in which said capture slots provide one or more horizontal slots for accommodating expansion or contraction of a pipeline.

19. The connecting apparatus according to claim 10, wherein said pivot axis member comprises a pair of trunnions on the pipeline termination assembly.

20. The method according to claim 2, wherein said capture device is fixedly mounted on the subsea structure.

* * * * *